US005289798A

United States Patent [19]
Lock

[11] Patent Number: 5,289,798
[45] Date of Patent: Mar. 1, 1994

[54] LIVESTOCK HANDLING/FEEDING APPARATUS AND METHOD

[76] Inventor: Stanley L. Lock, Rte. 1, Box 116A, Republic, Mo. 65738

[21] Appl. No.: 4,831

[22] Filed: Jan. 19, 1993

Related U.S. Application Data

[63] Continuation-in-part of Ser. No. 833,481, Feb. 10, 1992, Pat. No. 5,178,096.

[51] Int. Cl.$^5$ ................................................ A01K 1/06
[52] U.S. Cl. ..................................... 119/58; 119/740; 119/746; 119/750
[58] Field of Search ..................... 119/58, 147.1, 148, 119/149, 150, 98

[56] References Cited

U.S. PATENT DOCUMENTS

| | | | |
|---|---|---|---|
| 3,906,901 | 9/1975 | Cox | 119/58 |
| 3,949,706 | 4/1976 | Coon | 119/58 |
| 4,037,566 | 7/1977 | Albers | 119/147 |
| 4,055,149 | 10/1977 | Haiges | 119/148 |
| 4,258,663 | 3/1981 | Schoessow | 119/58 |
| 4,314,528 | 2/1982 | Fogleman | 119/148 |
| 4,419,963 | 12/1983 | Willibrordus | 119/58 |
| 4,457,265 | 7/1984 | Anderson | 119/148 |
| 4,476,815 | 10/1984 | Albers, Sr. | 119/148 |
| 4,495,897 | 1/1985 | Albers | 119/148 |
| 4,574,741 | 3/1986 | Mahler | 119/98 |
| 4,867,105 | 9/1989 | Hatfield | 119/148 |
| 4,930,452 | 6/1990 | DaSilveira | 119/148 |
| 4,940,022 | 7/1990 | Spinder | 119/147.1 |

FOREIGN PATENT DOCUMENTS 1088388 10/1980 Canada .
569531 1/1933 Fed. Rep. of Germany ...... 119/148

Primary Examiner—John G. Weiss
Attorney, Agent, or Firm—Litman, McMahon & Brown

[57] ABSTRACT

An improved livestock handling apparatus and method include a frame mounted on wheels having a plurality of stanchions arranged in side-by-side relationship along sides thereof such that livestock can place their heads through the stanchions in a first position, and reach feed placed in troughs and bales placed on rails spaced interiorally to the apparatus. Locking mechanisms, each comprising a pivotally mounted latch abutting an upper end of a pivotable sidebar of each of the stanchions, automatically lock the sidebar in a second position such that an animal cannot pass its head into, or remove its head from, one of the stanchion. A deactivator, including an axially rotatable rod having nubs spaced therealong, interacts with the latches to deactivate the locking mechanisms such that the livestock can pass their head through and remove their head from the stanchions. In a second embodiment, should a confined animal become injured or unconscious, the pivotable sidebar, once the latches are deactivated, pivots to a third position in which the animal can be easily removed from the lower portion of the stanchion. A selectively openable gate at one end of the apparatus provides interior access.

15 Claims, 3 Drawing Sheets

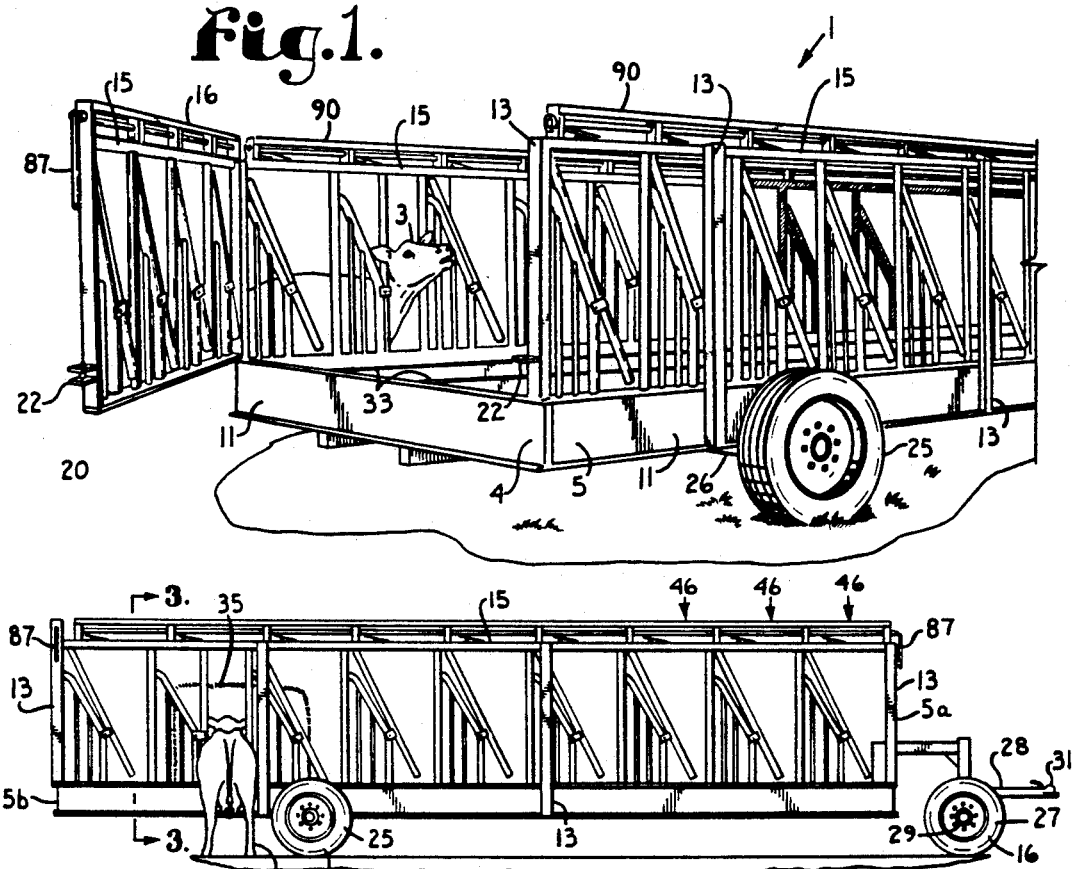
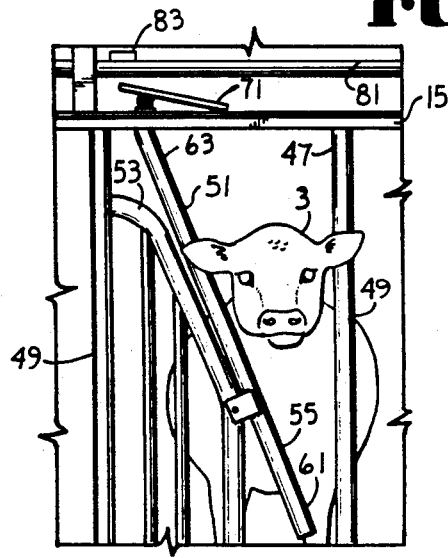
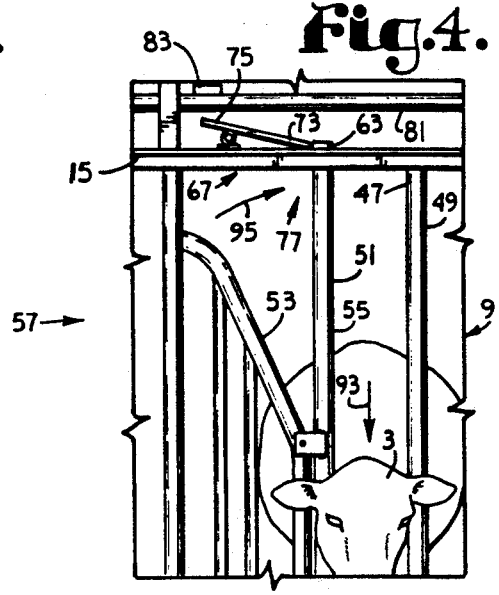

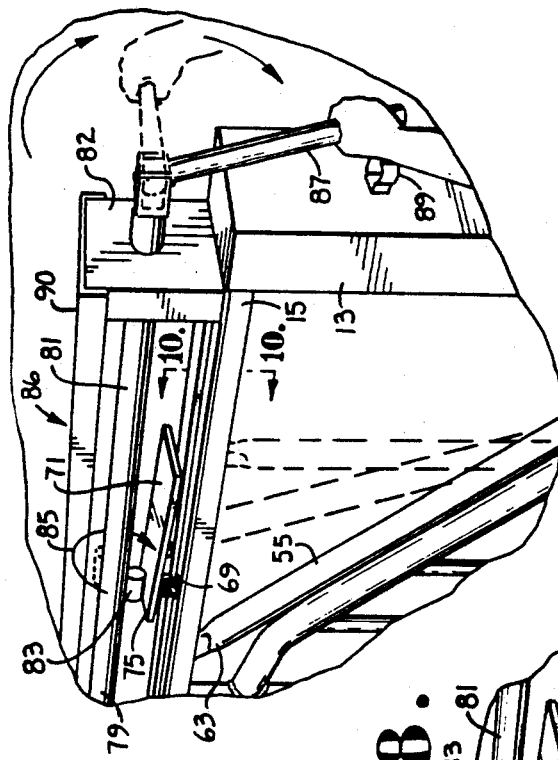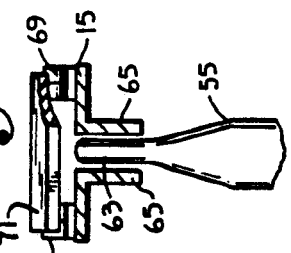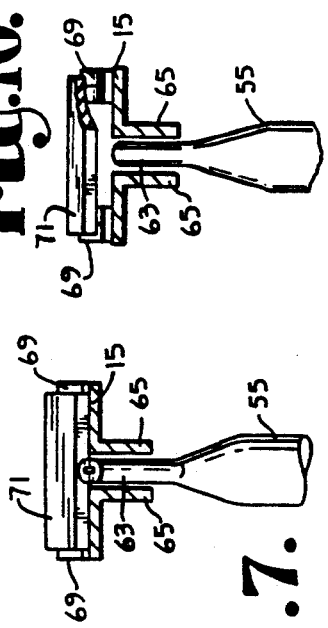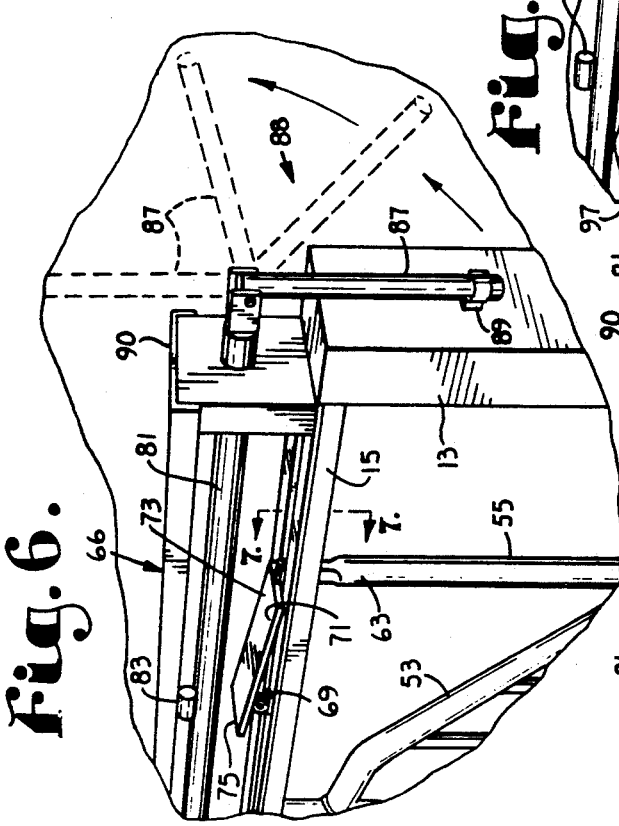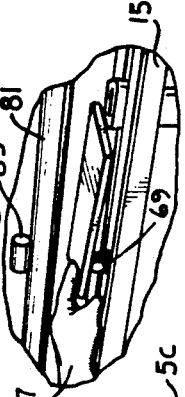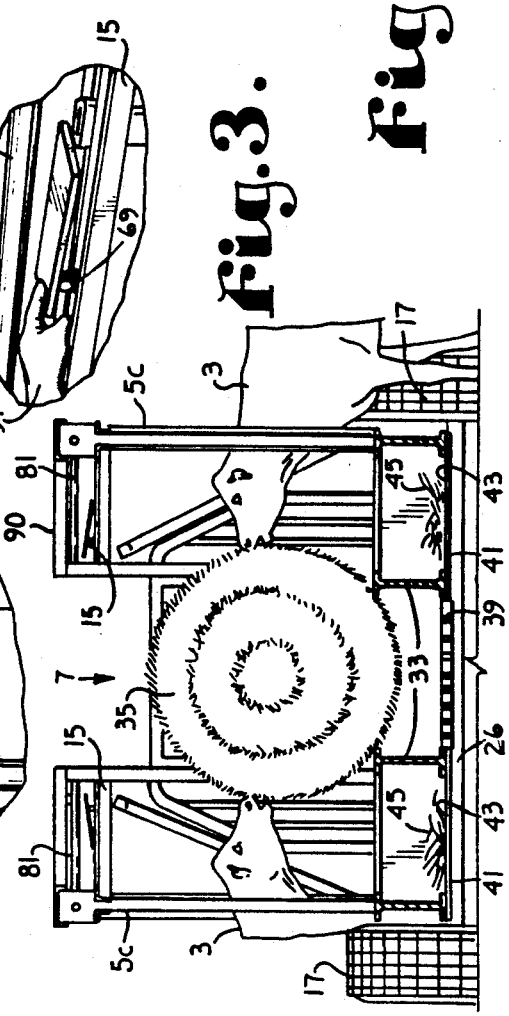

LIVESTOCK HANDLING/FEEDING APPARATUS AND METHOD

This is a continuation-in-part of application Ser. No. 07/833,481, filed Feb. 10, 1992 now U.S. Pat. No. 5,178,096.

BACKGROUND OF THE INVENTION

1. Field of the Invention

The present invention relates to an apparatus and method for handling and/or feeding livestock and, in particular, to a combination apparatus and method for feeding and/or selectively immobilizing the livestock with mobile stanchions.

2. Description of the Related Art

Various types of apparatuses have been developed for handling (e.g. immobilizing livestock for various purposes, such as vaccinating, de-horning, artificial insemination, and the like). Some of those apparatuses include locking and releasing mechanisms for automatic locking and releasing livestock immobilized thereby. Unfortunately, most of such locking and releasing mechanisms operate by translational displacement of certain components thereof. As a result, such mechanisms tend to jam or require relatively frequent maintenance in order to assure continued functioning of the apparatuses as originally intended.

Some of the apparatuses of the prior art are not portable, but are installed at a fixed location. As a result, livestock must be driven or transported to the location of the apparatus which, many times, may be time-consuming, inconvenient, and cost ineffective.

Many of the apparatuses of the prior art which are portable are designed for immobilizing purposes only. As a result, the usefulness of such apparatuses is limited to only those times when used for immobilizing livestock. During the remainder of the available time, the investment therein is non-productive as the apparatus stands idle.

What is needed is an apparatus and a method whereby the apparatus can be transported to the livestock ready for immediate use; which has locking mechanisms which function substantially in such a manner, such as pivotally, whereby reliability is substantially improved and maintenance is substantially reduced or eliminated; and which can be used for alternative purposes, such as feeding large round hay bales to livestock during those periods of time when the apparatus is not needed for handling purposes.

SUMMARY OF THE INVENTION

An improved livestock handling/feeding apparatus and method are provided for feeding feed and large round hay bales to a plurality of farm animals or livestock, particularly cattle, and for immobilizing the farm animals. The apparatus includes a frame, which is rectangularly shaped, having four sides including a front end, a rear end, and a pair of opposing sides. The frame has an understructure, a plurality of uprights, and a pair of parallelly spaced apart guide rails secured near upper extremities of the uprights, generally along each of the four sides. The rear end generally includes a selectively openable gate portion, which provides interior access to the apparatus.

The apparatus is generally mounted on wheels consisting of a transverse axle having a pair of side wheels mounted thereon and a dolly-type front wheel arrangement which, in conjunction with the side wheels, provide stand-alone support for the apparatus. A tongue with a hitch is connected to the front wheel arrangement such that the apparatus can be towed.

A plurality of stanchions are arranged in generally side-by-side relationship along each of the four sides of the apparatus. Each of the stanchions includes a first sidebar, which is fixedly connected to the frame such that the first sidebar is generally vertically oriented; a pivot support, which is fixedly connected to the frame; and a second sidebar, which is pivotally connected to the pivot support. Each of the second sidebars has a sidebar upper end which is slidingly connected between the respective pair of guide rails.

Each of the stanchions has a first configuration wherein the second sidebar is generally parallel to the first sidebar and is spaced from the first sidebar such that a neck of one of the livestock can be contained between the first sidebar and the second sidebar such that the livestock cannot pass its head between the first sidebar and the second sidebar. As one of the second sidebars approaches and assumes the first configuration, the respective sidebar upper end protrudes above the respective pair of guide rails.

Each of the stanchions also has a second configuration wherein a lower end of the respective second sidebar is spaced toward the respective first sidebar and the respective sidebar upper end is spaced away from the first sidebar such that one of the livestock can pass its head between the sidebar upper end and the first sidebar.

Each of the stanchions has a latching mechanism, which includes a latch having a lock end and a release end; and a pair of hubs, each connected to a respective one of the pair of side rails such that the respective sidebar upper end of the stanchion can pass between the pair of hubs. The respective pair of hubs are connected intermediately to the respective latch such that the latch pivots about a generally horizontally oriented axis and such that the lock end thereof is gravitationally urged downwardly to abut, in close proximity to the respective sidebar upper end, upper extremities of the guide rails as the respective second sidebar assumes the first configuration.

The apparatus also includes a deactivator for each group of the stanchions which are arranged in generally side-by-side relationship. The deactivator, which has an activated configuration and a deactivated configuration, includes a rod spaced generally parallel relative to the respective guide rails, a plurality of spacers adapted to mount the rod to the frame such that the rod is axially rotatable, and a plurality of nubs secured to the rod such that the nubs are aligned generally colinearly.

As the activator assumes the activated configuration, the rod is axially rotated such that the nubs are spaced away from the respective release ends of the latching mechanism whereby the respective lock ends gravitationally abut the respective guide rails. As the deactivator assumes the deactivated configuration, the nubs are rotated toward the guide rails such that the nubs interact with the respective release ends whereby the respective sidebar upper ends can pass beneath the respective latches from the first configuration to the second configuration.

In a second embodiment of the invention, the second or pivotable sidebar in each stanchion includes a counterweight which passes through a split pair of supports forming the pivot support. The latch mechanism in each stanchion comprises a pair of latches, each with a lock end and a release end. As in the first embodiment, as the activator assumes the activated position, the lock ends of both latches gravitationally abut the respective guide rails. As the activator is turned to the deactivated configuration, the release ends of both latches in each stanchion are raised, releasing the sidebar upper ends, making the side bar free to rotate in either one of two directions. In a normal circumstance, where the secured livestock is conscious and standing, the head and neck of the animal will force the sidebar top away from the stationary sidebar, as in the first embodiment. However, if the livestock is unable to stand up, either due to injury or unconsciousness, the weight of the animal's head and neck will force the top of the pivotable sidebar toward the stationary sidebar, pivoting the lower end of the pivotable sidebar away from the stationary sidebar and allowing the injured or unconscious animal to be removed from the stanchion.

The apparatus includes a handle pivotally connected to each of the rods such that the handle can assume a downwardly depending configuration as the deactivator assumes the activated configuration and as the deactivator assumes the deactivated configuration. A connector is connected to the frame such that the handle can be selectively secured in the downwardly depending configuration.

The apparatus generally includes a pair of parallelly spaced apart bale rails for holding and positioning round bales for accessibility thereto by livestock which have inserted their heads into the stanchions. A trough generally extends interiorly along each side of the apparatus for holding feed for the livestock which have inserted their heads into the stanchions.

The method includes the steps of providing an apparatus as hereinbefore described, placing the deactivator in the activated configuration, placing feed interiorally to the apparatus, and placing the apparatus such that the livestock can pass their heads through the stanchions. Subsequent steps of the methods include placing the apparatus in the deactivated configuration whereby the livestock can withdraw their heads from the stanchions.

PRINCIPAL OBJECTS AND ADVANTAGES OF THE INVENTION

Therefore, the principal objects and advantages of the present invention include: providing an apparatus and a method for feeding and immobilizing livestock; providing such an apparatus and a method whereby a plurality of the livestock can be selectively, automatically immobilized; providing such an apparatus and a method whereby individual ones of the livestock immobilized therein can be selectively released; providing such an apparatus and a method whereby a plurality of the livestock immobilized therein can be selectively released; providing such an apparatus which is portable; providing such an apparatus which has a minimal number of components; providing a second embodiment of the apparatus in which an injured or unconscious animal can be safely released; and generally providing such an apparatus which is efficient and reliable, economical to manufacture, simple to maintain, and which generally performs the requirements of its intended purpose.

Other principal objects and advantages of this invention will become apparent from the following description taken in conjunction with the accompanying drawings where are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective and fragmentary view of a livestock handling/feeding apparatus, according to the present invention.

FIG. 2 is a reduced, side elevational view of the livestock handling/feeding apparatus.

FIG. 3 is an enlarged and fragmentary, cross-sectional view of the livestock handling/feeding apparatus, taken generally along line 3—3 of FIG. 2.

FIG. 4 is a further enlarged and fragmentary view of the livestock handling/feeding apparatus, showing a stanchion in a locked configuration.

FIG. 5 is a further enlarged and fragmentary view of the livestock handling/feeding apparatus, showing the stanchion in an unlocked configuration.

FIG. 6 is a further enlarged and fragmentary, perspective view of the livestock handling/feeding apparatus, showing a latch and a pivotable sidebar in a locking configuration.

FIG. 7 is a further enlarged and fragmentary, partially cross-sectional view of the livestock handling/feeding apparatus, showing the latch and the pivotable stanchion sidebar, taken generally along line 7—7 of FIG. 6.

FIG. 8 is a further enlarged and fragmentary, perspective view of the livestock handling/feeding apparatus, showing the latch being manually controlled.

FIG. 9 is a further enlarged and fragmentary, perspective view of the livestock handling/feeding apparatus, showing the latch and the pivotable stanchion sidebar in a non-locking configuration.

FIG. 10 is a still further enlarged and fragmentary, partially cross-sectional view of the livestock handling/feeding apparatus, taken generally along line 10—10 of FIG. 9, with portions cut away to reveal details thereof, according to the present invention.

DETAILED DESCRIPTION OF THE INVENTION

Figure 11:
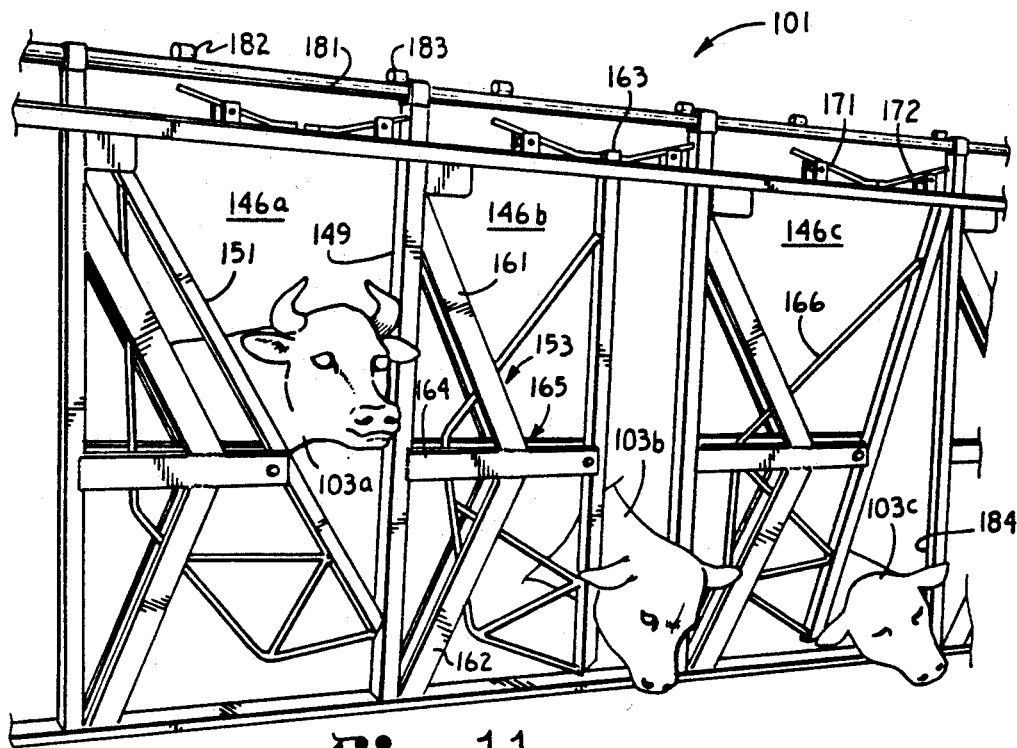
FIG. 11 is a perspective view of a second embodiment of the livestock handling/feeding apparatus, showing pivotable sidebars in three different positions.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a livestock handling/feeding apparatus and method for use in feeding and immobilizing livestock, such as cattle 3 in accordance with the present invention, as shown in FIG. 1-10. The apparatus 1 comprises supporting means 4, feed holding means 7, and immobilizing means 9. The supporting means 4 has a generally rectangularly shaped frame 5, with a front end 5a, a rear end 5b, a pair of opposing sides 5c, an understructure 11 rigidly connected to a plurality of uprights 13, and top rails 15.

The rear end 5b generally comprises a gate portion 16 pivotally connected to a remaining portion 18 of the supporting means 5 about a generally vertically oriented axis. The gate portion 16 pivots from an open configuration 20, wherein the feed holding means 7 are accessible to a user, as shown in FIG. 1, to a closed configuration (not shown) wherein the feed holding means 7 are generally completely surrounded by the immobilizing means 9 and the supporting means 5. The gate portion 16 is secured in the (not shown) closed configuration by securing means 22.

The apparatus 1 is generally mounted on wheels 24, for portability, such as a pair of opposing side wheels 25 having a fixed transverse back axle 26 therebetween, by methods commonly known in the art, and one or more front wheels 27. The front wheels 21 interconnect a tongue 28 and the front end 5a of the apparatus 1, a shown in FIG. 2. The back axle 26 is generally spaced nearer to the back end 5b of the apparatus 1 than to the front end 5a of the apparatus 1.

The front wheels 27 are pivotally connected to a generally horizontally oriented front axle 29 and the front axle is generally pivotable about a generally vertically oriented axis, as designated AA in FIG. 2. The front wheels 27 are generally closely spaced together, forming a dolly-type arrangement, which is adapted to provide sufficient clearance between the front wheels 27 and the front end 5a as the apparatus 1 is being arcuately turned. The front wheels 27 and the side wheels 25 are adapted to support the apparatus 1, with feed loaded thereon, as hereinafter described, such that the apparatus 1 can be parked in a pasture, or other suitable location, in a stand-alone arrangement for feeding the livestock 3.

The tongue 28 generally includes a hitch 31 such that the apparatus 1 can be relocated by towing behind a powered vehicle, such as a pickup, a tractor, or other suitable means (not shown).

Feed holding means 7 generally include a pair of lengthwise beams or bale rails 33, which are appropriately spaced apart to support large round hay bales 35 such that the cattle 3 can easily reach the bales 35 from either of the opposing sides 5c of the apparatus 1, as shown in FIG. 3.

A first partial floor 39 between the bale rails 33 is generally comprised of expanded mesh or other suitable material such that small particles and rainwater readily fall therethrough. The first partial floor 39 is constructed sufficiently ruggedly to support one or more persons (not shown) standing and walking thereon.

The feed holding means 7 also include second partial floors 41, which form troughs 43 lengthwise adjacent to each of the opposing sides 5c, as shown in FIG. 3. The partial floors 41 are generally constructed of solid material such that feed 45 can be placed therein. The partial floors 41 are constructed sufficiently ruggedly to support one or more persons standing and walking thereon.

The immobilizing means 9 generally include a plurality of stanchions 46 arranged in generally side-by-side relationship along the front end 5a, the rear end 5b, and the sides 5c of the apparatus 1. Each of the stanchions 46 includes a first or fixed stanchion side 47, which includes a first sidebar 49 rigidly secured to the understructure 11 and to the top rails 15, as appropriate, such that the first sidebar 49 is generally vertically oriented.

The immobilizing means 9 also include a second stanchion side 51, which includes a pivot support 53 and a second or pivotable sidebar 55. The pivot support 53 is generally rigidly secured to the understructure 11 and an adjacent one of the first sidebars 49, as shown in FIG. 4. Alternatively, the pivot support 53 may be a solid panel (not shown) with appropriate edges thereof secured to the understructure 11 and an adjacent one of the first sidebars 49.

The second sidebar 55 is intermediately connected to the pivot support 53 such that the second sidebar 55 is pivotable from a first configuration, as shown in FIG. 4 and as designated by the numeral 57, to a second configuration, as shown in FIG. 5 and as designated by the numeral 59.

As the apparatus 1 is in the first configuration 57, the first sidebar 49 and the second sidebar 55 are generally parallel and are spaced apart such that the animal 3 cannot pass its head, by ingress or by egress, therebetween. As the second sidebar 55 is pivoted from the first configuration 57 to the second configuration 59, a lower end 61 of the second sidebar 55 is displaced toward the first sidebar 49 and an upper end 63 of the second sidebar 55 is displaced away from the first sidebar 49 such that the animal 3 can pass its head, by ingress and by egress, between the sidebar upper end 63 and the first sidebar 49, as shown in FIG. 5.

Each of the top rails 15 generally comprise a pair of parallelly spaced apart angles or guide rails 65, as shown in FIG. 7, such that the sidebar upper end 63 is slidingly connected to a respective one of the top rails 15 and such that the second sidebar 55 generally pivots in a plane formed by the first sidebar 49 and the second sidebar 55. The pivotal mounting of the second sidebar 55 is generally slightly unstable such that the sidebar upper end 63 generally gravitationally tends to fall away from the first sidebar 49. The sidebar upper end 63 is adapted to protrude above upper extremities of the guide rails 65 as the second sidebar 55 is displaced to the second configuration 59 as hereinafter described.

The apparatus 1 also includes locking means 66, such as a latching mechanism 67, for automatically locking each of the immobilizing means 9 as respective ones of the immobilizing means 9 assume the first configuration 57. The latching mechanism 67 generally includes a pair of opposing hubs 69, each of which is connected to an upper extremity of a respective one of the pair of guide rails 65 such that the sidebar upper end 63 can pass between the hubs 69 as the second sidebar 55 is pivoted from the second configuration 59 to the first configuration 57.

The latching mechanism 67 also includes a latch 71, which is connected to a respective pair of the hubs 69 such that the latch 71 pivots about a generally horizontal axis oriented transversely to the pair of guide rails 65 and such that the sidebar upper end 63 can pass beneath the latch 71 as the second sidebar 55 is pivoted from the second configuration 59 to the first configuration 57. The latch 71 has a latch lock end 73 and a latch release end 75. The latch 71 is connected off-center to the hubs 69 such that the latch lock end 73 is generally gravitationally urged downwardly. The latch 71 and hubs 69 are spaced such that the latch 71 assumes an activated configuration, as designated by the numeral 77 in FIG. 4, whereat the latch lock end 73 is spaced near and alongside the respective sidebar upper end 63 as the second sidebar 55 is in the first configuration 57.

The apparatus 1 also includes deactivating means, such as a deactivator 79, for selectively deactivating the locking means 66. For each of the front end 5a, the rear end 5b, and the opposing sides 5c, the deactivator 79 generally includes an elongate, generally horizontally oriented rod 81, which is connected to the guide rails 65 with spacers 82 such that the rod 81 is axially pivotable.

The deactivator means 79 also includes a plurality of nubs 83, one for each of the respective latching mechanisms 67. The nubs 83 are secured to the rod 81 such that the nubs 83 can be rotated away from the respective latch upper ends 75, allowing the respective latches 71 to assume the activated configuration 77, as shown in FIG. 6. Similarly, the nubs 83 can be rotated, as indicated by the arrow designated by the numeral 85 in FIG. 9, such that the nubs 83 interact with the respective latch upper ends 75, thereby assuming a deactivated configuration, as indicated by the numeral 86 in FIG. 9, whereby the locking means 66 is deactivated and the respective sidebar upper end 63 can readily pass uninhibitedly beneath the latch 71, as shown in FIG. 9.

A handle 87 is pivotally connected to one end of the rod 81 such that the handle 87 can assume a generally downwardly depending configuration relative to the rod 81, as indicated by the numeral 88 in FIG. 6, as the respective nubs 83 are in the activated configuration 77 and in the deactivated configuration 86. A connector 89 is secured to the supporting means 5 such that the handle 87 can be latched in the downwardly depending configuration 88.

A protective top plate 90, as is shown in FIGS. 1, 6 and 7, is positioned in the apparatus 1 above the horizontally oriented rod 81. The top plate 90, shown here as an elongate section of angle material, protects the rod 81 and the other associated latching structure from damage from above caused by objects, such as heavy hay bales and bale loading machinery.

In an application of the present invention, the securing means 22 is manipulated such that the gate portion 16 can be opened, providing access to the interior of the apparatus, as shown in FIG. 1. If the livestock 3 are to be treated from the interior of the apparatus 1, then, generally, only the feed 45 is placed in the troughs 43. However, if the livestock 3 will not be treated from the interior of the apparatus 1, the hay bales 35 may be positioned on the bale rails 33 instead of, or in addition to, placement of the feed 45 in the troughs 43. After placement of the hay bales 35 and/or the feed 45 in the apparatus 1, the gate portion 16 is closed and secured by the securing means 22. The apparatus 1 is then towed, as desired, to a location where the apparatus 1 will be readily accessible to the livestock 3.

If the livestock 3 are to have free access to the bales 35 and the feed 45, then the handle 87 is disconnected from the connector 9 and rotated such that the nubs 83 are displaced toward the respective release ends 75 of the latches 71, thereby placing the deactivator 79 in the deactivated configuration 86.

Upon observing the bales 35 and/or the feed 45 contained in the apparatus 1, the cattle 3 will attempt to attain access thereto. Because of the built-in instability of the second stanchion sides 51, some of the second stanchion sides 51 will assume the second configuration 59 whereby the livestock 3 can insert their heads between the respective sidebar upper end 63 and the respective first sidebars 49, as shown in FIG. 5. For the stanchions 46 which do not automatically assume the second configuration 59, those stanchions 46 will readily assume the second configuration 59 as the cattle 3 urge their heads against those stanchions 46 in an attempt to reach the hay bales 35 and/or the feed 45.

After inserting their heads through the stanchions 46, the cattle 3 will naturally lower their heads to reach the hay bales 35 and/or the feed 45, as indicated by the arrow designated by the numeral 93 in FIG. 4, causing the respective second stanchion side 51 to rotate and assume the first configuration 57, as indicated by the arrow designated by the numeral 95 in FIG. 4. After feeding, the cattle 3 simply elevate their heads and back away from the apparatus 1, causing the respective second stanchion sides 51 to rotate back to the second configuration 59.

If, however, it is desired to use the apparatus 1 for immobilizing the cattle 3, the handle 87 is manipulated such that the nubs 83 are rotated away from the latch release ends 75, thereby placing the latching mechanism 57 in the activated configuration 77. Then, as the cattle 3 lower their heads, as indicated by the arrows designated 93, the respective sidebar upper ends 63 pass beneath the respective latch lock ends 73. As the second stanchion sides 51 assume the first configuration 57, the respective latch lock ends 73 are gravitationally urged downward to abut the guide rails 15, whereby the sidebar upper ends 63 are prevented from passing back beneath the respective latches 71. The spacing between the first sidebars 49 and the second sidebar 55 is dimensioned to contain the necks of the livestock 3 therebetween but to prevent the withdrawal of the heads of the livestock 3 as the respective stanchions 46 assume the first configuration 57.

The spacing between the stanchions 46 in side-by-side relationship is such that ones of the livestock 3 confined between others of the livestock, adjacently disposed on both sides thereof, substantially limiting sidewise movement of body portions extending outwardly from the apparatus 1 of such intermediately disposed ones of the livestock 3. In one application of the present invention, the effective width of each of the stanchions 46 was approximately twenty-two inches.

After treating the livestock 3, the stanchions 46 can either be simultaneously unlocked by manipulating the handle 87 such that the deactivator 79 is placed in the deactivated configuration 86, or the livestock 3 can be individually released by manually pressing downwardly on an appropriate one of the release ends 75 with a hand 97, or the like, as shown in FIG. 8. In the latter case, other ones of the livestock 3 may then become immobilized by the apparatus 1 as treatment is provided to the livestock 3 which have not been released.

When the apparatus 1 is to be used for feeding purposes only, it is a simple matter to leave the handle 87 secured in the downwardly-depending configuration 88 by the connector 89 with the deactivator 79 in the deactivated configuration 86, whereby the livestock 3 will not be inadvertently locked in the stanchions 46.

Similarly, if bales 35 and/or feed 45 have been placed in the apparatus 1, and it is desired that the livestock 3 do not have access thereto, it is a simple matter to secure the handle 87 in the downwardly-depending configuration 88 by the connector 89 with the deactivator 79 in the activated configuration 77 and each of the second sidebars 55 disposed and locked in the first configuration 57.

If the livestock 3 are to be treated from the interior of the apparatus 1, then it is simple matter for a veterinarian or others to open the gate portion 16 after the livestock 3 are immobilized by the apparatus 1, and move among the heads of the livestock 3 by walking and standing on the first partial floor 39 and/or the second partial floors 41.

Figure 12:
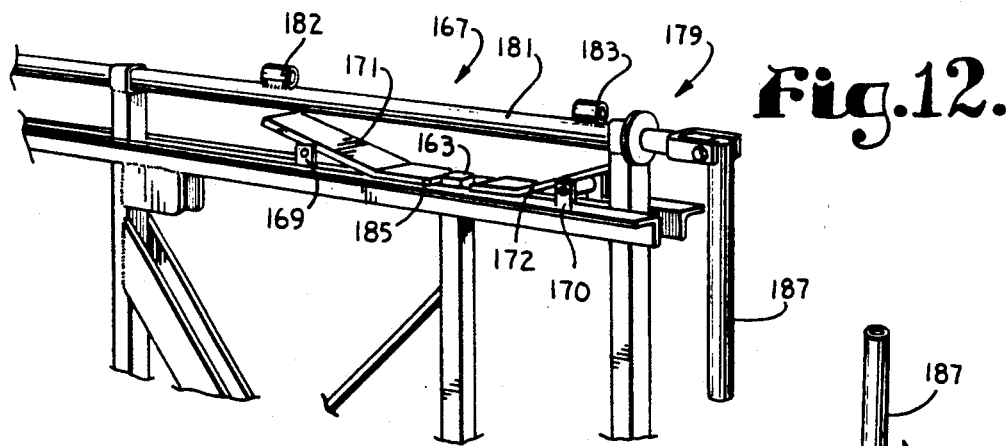
FIG. 12 is an enlarged and fragmentary perspective view of a latch in the embodiment of FIG. 11, with the pivotable sidebar latched in a center position.
Figure 13:
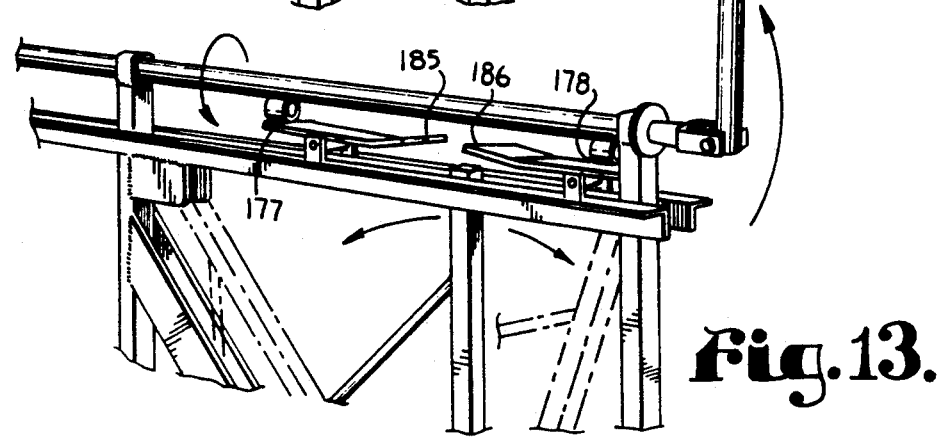
FIG. 13 is an enlarged and fragmentary perspective view of a latch in the embodiment of FIG. 11, with the latches released, allowing the pivotable sidebar to move in either direction.

Referring to FIGS. 11-13, a second embodiment of the livestock handling/feeding apparatus is generally indicated as 101. In this apparatus, a plurality of stanchions 146a-146c are illustrated in FIG. 11. The stanchions 146a-146c differ from the stanchions 46 of the first embodiment in a number of significant features. As in the first embodiment, in each stanchion 146a-146c, a pivotable side bar 151 and a stationary sidebar 149 are provided. However, a pivot support 153, including an upper angled brace 161, a lower angled brace 162 and a horizontal support 164 are each constructed from separate spaced flat metal straps welded together at a junction point 165. Each of the pivotable sidebars 151 includes a counterweight 166 attached thereto. Each counterweight 165 is constructed from a plurality of tubes or pipes which form a U shape which is welded near the top and the bottom of the respective pivotable sidebar 151. The counterweights 165 extend between the metal straps which form the pivot support 153.

Referring to FIGS. 12 and 13, a latching mechanism 167 for one of the stanchions 146a-146c is illustrated. The latching mechanism 167 includes a pair of latches 171 and 172, each of which is pivotable about a respective hub 169 and 170. An upper end 163 of the pivotable sidebar 151 is capable of passing between the ends of each of the hubs 169 and 170. A deactivator means 179 includes a rod 181 with a respective pair of nubs 182 and 183 in each stanchion 146a-146c, with the nub 182 positioned above a latch release end 175 of the latch 171 and the nub 183 positioned above a latch release end 177 of the latch 172. These nubs 182 and 183 in the deactivator means 179 function in the same manner as the nub 83 in the deactivator means 81 in the deactivator means 79 of FIGS. 6-10 described above.

The operation of the second embodiment of the invention will not be described, again with reference to FIGS. 11-13. In FIG. 11, from left to right, a cow 103a is shown entering the stanchion 146a. In the stanchion 146b, the cow 103b has dropped her head to feed on hay or other material inside the stanchion 146b. With this action the top portion of the sidebar 151 is pivoted to the right, causing the upper end 163 of the sidebar 151 to be latched between latch lock ends 185 and 186, respectively of the latches 171 and 172, as shown in FIG. 12. In this position, the cow 103b is effectively immobilized by the sidebars 151 and 149. Under normal circumstances, when the cow 103b is to be released, a handle 187 is turned, causing the nubs 182 and 183 to force the respective release ends 177 and 178 of the latches 171 and 172 downward, releasing the upper end 163 of the sidebar 151. The cow 103b then raises her head, and this action, combined with the effect of the counterweight 165, causes the top of upper end 163 of the sidebar 151 to pivot to the left, releasing the cow, as in stanchion 146a. Thus, under normal circumstances, the embodiment of FIGS. 11-13 functions in an identical fashion to that of FIG. 4-10.

However, in the embodiment of FIGS. 4-10, should the cow 3 become injured or unconscious, the weight of the cow's head and neck would prevent the sidebar 55 from pivoting and the injured animal 3 would be difficult or impossible to remove from stanchion 46. By contrast, in FIG. 11, stanchion 146c holds an injured cow 103c. In this embodiment, with the sidebar 151 free to pivot in either direction, as shown in FIG. 13, the weight of the injured animal is sufficient to cause the upper end 163 of the sidebar 151 to pivot to the right, thus creating an opening 184 in the lower portion of the stanchion 146c which is sufficient to give the injured cow 103c room to breath and allow it to be easily removed.

In one application of the present invention, eleven of the stanchions 46 or 146 were disposed along each of the opposing sides 5c, four of the stanchions 46 or 146 were disposed along the gate portion 16, and two of the stanchions 46 or 146 were disposed along the front end 5a, for a total of twenty-eight of the stanchions 46 or 146 contained in the apparatus 1. While the invention has been illustrated as forming the sides of a portable vehicle, it should be apparent that a number of the stanchions 46 or 146 can form a free standing fence-like structure with no attached vehicle structure.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for handling at least one farm animal, comprising:
  (a) immobilizing means for immobilizing the farm animal; said immobilizing means having a first configuration adapted to allow the farm animal to pass its head through an upper portion of the apparatus, a second configuration adapted to prevent the farm animal from passing its head therethrough, and a third configuration adapted to allow the farm animal to pass its head through a lower portion of the apparatus, said immobilizing means including a pivotable sidebar which is mounted to pivot about a pivot support such that, when said immobilizing means is in said second configuration said pivotable sidebar is in a center position, when said immobilizing means is in said first configuration said pivotable sidebar is moved from said center position in a first direction and when said immobilizing means is in said third configuration said pivotable sidebar is moved from said center position in a second direction opposite from said first direction;
  (b) locking means for automatically locking said immobilizing means as said immobilizing means assumes said second configuration;
  (c) deactivating means for selectively deactivating said locking means; and
  (d) said pivotable sidebar includes weighting means which is attached to said pivotable sidebar and which extends above and below said pivot point, said weighting means causing said pivotable sidebar to continue to pivot in said first direction when it is initially moved off of said center position in said first direction and which also causes said pivotable sidebar to continue to pivot in said second direction when it is initially moved off of said center position in said second direction.

2. An apparatus as in claim 1, wherein:
  (a) said deactivating means includes an elongate, generally horizontally oriented rod connected to a supporting means such that said elongate rod is axially rotatable.

3. The apparatus according to claim 1, wherein:
(a) there are a plurality of said immobilizing means, said plurality of immobilizing means are generally spaced in side-by-side relationship.

4. The apparatus according to claim 3, wherein:
(a) the lateral dimensions of each of said immobilizing means is approximately twenty-two inches.

5. The apparatus according to claim 1, wherein:
(a) said immobilizing means has:
  (1) an first stanchion side including a fixed sidebar rigidly secured to a supporting means such that said first stanchion side is generally upright; and
  (2) a second stanchion side including said pivot support, said pivotable sidebar having a sidebar upper end and a sidebar lower end; said pivot support rigidly secured to said supporting means, said pivotable sidebar intermediately and pivotably connected to said pivot support; said weighting means comprising a counterweight attached.

6. The apparatus according to claim 5, wherein:
(a) said pivotable sidebar pivots from said first configuration, wherein said sidebar lower end is displaced toward said fixed sidebar and said sidebar upper end is displaced away from said fixed sidebar such that the animal's head can pass between said sidebar upper end and said fixed sidebar, to said second configuration, wherein said fixed sidebar and said pivotable sidebar are generally parallel and are spaced apart such that the animal's head cannot pass therebetween; said sidebar upper end slidingly connected to said supporting means such that said pivotable sidebar generally pivots in a plane formed by said fixed sidebar and said pivotable sidebar; and
(b) said locking means automatically locking said pivotable sidebar in said second configuration unless it is deactivated by said deactivation means.

7. The apparatus according to claim 6, wherein:
(a) said pivotable sidebar pivots from said second configuration to said first configuration when said deactivating means deactivates said locking means and said animal raises its head, and said pivotable sidebar pivots from said second configuration to said third configuration when said deactivating means deactivates said locking means and said animal drops its head.

8. The apparatus according to claim 7, wherein:
(a) said supporting means has a parallelly spaced apart, pair of guide rails spaced generally above said immobilizing means, which are spaced in side-by-side relationship;
(b) each of said sidebar upper ends of said pivotable sidebars are adapted to protrude above upper extremities of said pair of guide rails as respective said pivotable sidebar assumes said second configuration; and
(c) said locking means includes a pair of latching mechanisms for each of said immobilizing means; each said latching mechanism including:
  (1) two pair of opposing hubs, each of which is secured to an upper extremity of a respective one of said pair of guide rails such that respective said sidebar upper end can pass between each said pair of opposing hubs; and
  (2) a pair of latches, each having a latch lower end and a latch upper end; each said latch connected to a corresponding one of said hubs such that said latch pivots about a generally horizontal axis oriented transversely to said pair of guide rails and such that said sidebar upper end can pass beneath said latch; said latch connected off-center to said hubs such that said latch lower end is gravitationally urged downwardly; said latch spaced such that each said latch assumes an activated configuration whereat said latch lower end is near and alongside said sidebar upper end as said pivotable sidebar assumes said second configuration.

9. The apparatus according to claim 8, wherein:
(a) said deactivating means includes an elongate, generally horizontally oriented rod connected to a supporting means such that said rod is axially rotatable and includes a pair of nubs for each of said immobilizing means; each said nub secured to said rod whereat said nub can be rotated away from a respective one of said latch upper ends as said latch assumes said activated configuration and whereat said nub can be rotated such that said nub interacts with respective said latch upper end, causing said respective latch to assume a deactivated configuration whereat respective said sidebar upper end can pass beneath respective said latch.

10. The apparatus according to claim 9, including:
(a) a handle pivotally secured to an end of a respective one of said rods; said handle adapted to assume a generally downwardly depending configuration relative to said rod as said nubs are in said deactivating configuration and also as said nubs are in said activating configuration; and
(b) a connector adapted to selectively latch said handle in said downwardly depending configuration.

11. A combination feeding/immobilizing apparatus for feeding feed including large round hay bales to a plurality of farm animals and for immobilizing the farm animals, comprising:
(a) a frame having an understructure, a plurality of uprights, and a pair of parallelly spaced apart guide rails; said frame generally having four sides including a front end, a rear end comprising a selectively openable gate portion, and a pair of opposing sides;
(b) side wheels having an axle, which are adapted to provide mobility to said apparatus;
(c) a dolly-type front wheel arrangement having a tongue with a hitch adapted to be towed; said front wheel arrangement adapted, in conjunction with said side wheels, to provide stand alone support for said apparatus;
(d) a pair of bale rails; said bale rails parallelly spaced such that the round bales spaced thereon generally will not roll toward said opposing sides;
(e) a pair of troughs generally extending from said bale rails to said opposing sides;
(f) a plurality of stanchions arranged in side-by-side relationship along at least one of said four sides, each said stanchion comprising:
  (1) a first sidebar; said first sidebar fixedly connected to said frame such that said first sidebar is generally vertically oriented;
  (2) a pivot support; said pivot support fixedly connected to said frame; and
  (3) a second sidebar having a sidebar upper end and a sidebar lower end; said second sidebar pivotally connected to said pivot support and said upper end slidingly connected between said guide rails such that said second sidebar:

(A) has a first configuration adapted to allow the farm animal to pass its head through an upper portion of the apparatus;

(B) a second configuration adapted to prevent the farm animal from passing its head therethrough; and (C) a third configuration adapted to allow the farm animal to pass its head through a lower portion of the apparatus; and (D) pivots between said configurations in a vertically oriented plane defined by said first sidebar and said second sidebar;

(E) said second sidebar, when in said second configuration being in a center position, when in said first configuration being moved from said center position in a first direction and when in said third configuration being moved from said center position in a second direction opposite from said first direction;

(g) locking means for automatically locking said second sidebars as said second sidebars assume said second configuration; and (h) deactivating means for selectively deactivating said locking means; and (i) said second sidebars are adapted to assume said first configuration when deactivated if the farm animal raises its head, and to assume the third configuration when deactivated should the animal be unable to raise its head, said second sidebar including weighting means which extends above and below said pivot support and which causes said second sidebar to continue to pivot in said first direction when it is initially moved off of said center position in said first direction and which also causes said second sidebar to continue to pivot in said second direction when it is initially moved off of said center position in said second direction.

12. The apparatus according to claim 11, wherein:

(a) said second sidebars pivot from said second configuration to said first configuration when said deactivating means deactivates said locking means and said animal raises its head, and said second sidebars pivot from said second configuration to said third configuration when said deactivating means deactivates said locking means and said animal drops its head.

13. The apparatus according to claim 12, wherein:

(a) said frame has a parallelly spaced apart, pair of guide rails spaced generally above said stanchions;

(b) each of the sidebar upper ends of said second sidebars are adapted to protrude above upper extremities of said pair of guide rails as respective said second sidebar assumes said second configuration;

(c) said locking means includes a pair of latching mechanisms for each of said immobilizing means; each said latching mechanism including:

(1) two pair of opposing hubs, each of which is secured to an upper extremity of a respective one of said pair of guide rails such that a respective said second sidebar upper end can pass between each said pair of opposing hubs; and (2) a pair of latches, each having a latch lower end and a latch upper end; each said latch connected to a corresponding one of said hubs such that said latch pivots about a generally horizontal axis oriented transversely to said pair of guide rails and such that said sidebar upper end can pass beneath said latch; said latch connected off-center to said hubs such that said latch lower end is gravitationally urged downwardly; said latch spaced such that each said latch assumes an activated configuration whereat said latch lower end is near and alongside said sidebar upper end as said second sidebar assumes said second configuration.

14. The apparatus according to claim 13, wherein:

(a) said deactivating means includes an elongate, generally horizontally oriented rod connected to a supporting means such that said rod is axially rotatable and a pair of nubs for each of said stanchions; each said nub secured to said elongate rod whereat said nub can be rotated away from a respective one of said latch upper ends as said latch assumes said activated configuration and whereat said nub can be rotated such that said nub interacts with respective said latch upper end, causing said respective latch to assume a deactivated configuration whereat a respective said second sidebar upper end can pass beneath a respective said latch; and (d) said frame includes a protective top plate positioned above said elongate rod.

15. The apparatus according to claim 14, including:

(a) a handle pivotally secured to an end of said elongate rod; said handle adapted to assume a generally downwardly depending configuration relative to said rod as said nubs are in said deactivating configuration and also as said nubs are in said activating configuration; and (b) a connector adapted to selectively latch said handle in said downwardly depending configuration.

* * * * *